United States Patent
McNeil et al.

(10) Patent No.: US 8,322,996 B2
(45) Date of Patent: Dec. 4, 2012

(54) ASPIRATORS WITH BODIES COMPRISING WOUND FILAMENTS

(75) Inventors: Daniel A. McNeil, Metuchen, NJ (US); John O'Donnell, Brielle, NJ (US); Frank Brown, Bayville, NJ (US)

(73) Assignee: Air Cruisers Company, Wall, NJ (US)

( * ) Notice: Subject to any disclaimer, the term of this patent is extended or adjusted under 35 U.S.C. 154(b) by 716 days.

(21) Appl. No.: 12/366,877

(22) Filed: Feb. 6, 2009

(65) Prior Publication Data
US 2010/0202899 A1 Aug. 12, 2010

(51) Int. Cl.
*F04F 5/44* (2006.01)
*F04F 5/46* (2006.01)
*F04F 5/26* (2006.01)

(52) U.S. Cl. ........ 417/195; 137/889; 137/890; 417/163; 417/167; 417/168; 417/177; 417/182

(58) Field of Classification Search .......... 137/889, 137/890; 251/368; 417/163, 167, 168, 177, 417/182, 195
See application file for complete search history.

(56) References Cited

U.S. PATENT DOCUMENTS

| | | | | |
|---|---|---|---|---|
| 1,741,101 A | * | 12/1929 | Dinardo et al. | 417/155 |
| 3,640,645 A | * | 2/1972 | Forsythe | 417/174 |
| 3,771,913 A | * | 11/1973 | MacPherson et al. | 417/179 |
| 4,368,009 A | * | 1/1983 | Heimovics et al. | 417/191 |
| 5,007,803 A | * | 4/1991 | DiVito et al. | 417/137 |
| 6,071,084 A | | 6/2000 | Wass et al. | |
| 6,591,873 B1 | | 7/2003 | McNeil | |

* cited by examiner

*Primary Examiner* — Nimeshkumar Patel
*Assistant Examiner* — Steven Horikoshi
(74) *Attorney, Agent, or Firm* — Dean W. Russell; Kilpatrick Townsend & Stockton LLP (57) ABSTRACT

Aspirators for inflating devices such as (but not limited to) aircraft evacuation slides and rafts are detailed. Housings of the aspirators may be made of wound filaments of composite materials, reducing their weight as compared to conventional metal structures. Such actions as reconfiguring and repositioning jet nozzles within the housings also contribute to enhancing performance of the aspirators.

16 Claims, 8 Drawing Sheets

Fig. 12 ions. Although the Heimovics patent details an aspirator in
ASPIRATORS WITH BODIES COMPRISING WOUND FILAMENTS

FIELD OF THE INVENTION

This invention relates to devices used to inflate objects and more particularly, although not necessarily exclusively, to aspirators employed to control flow of inflation gas to evacuation slides and rafts.

BACKGROUND OF THE INVENTION

U.S. Pat. No. 4,368,009 to Heimovics, et al., whose contents are incorporated herein in their entirety by this reference, illustrates an aspirator intended to inflate structures including aircraft evacuation slides and rafts. The aspirator includes a housing made of fiber-reinforced plastic material and a pair of metal flapper valve plates. High-pressure gas enters the top of the housing in a single location along the (central) longitudinal axis of the housing, essentially perpendicular to a plane containing the flapper valve plates. The gas thereafter is exhausted by jets within the housing so as to create a localized region of low pressure therein, existence of which causes the flapper valve plates to open. Opening of the plates, in turn, allows ambient air to enter the housing for inflating a slide or raft.

An existing aspirator of the assignee of this application (referred to herein as the "Existing Air Cruisers Aspirator") comprises a housing made principally of metal, a pair of metal flapper valve plates, and two sets of jet nozzles spaced longitudinally within the housing. High-pressure gas enters the housing in two locations spaced longitudinally along a housing wall, essentially parallel to a plane containing the flapper valve plates. An inner concentric ring of nozzles positioned closer to the valve plates communicates with an upper gas entry location, while an outer concentric ring of nozzles positions farther from the valve plates communicates with the lower gas entry location.

Although the Heimovics patent details an aspirator in which high-pressure gas enters the top of the housing, most commercially successful aspirators, including the Existing Air Cruisers Aspirator, are side-entry devices. This configuration allows the entry apertures to be positioned longitudinally adjacent the nozzles, minimizing the distance the high-pressure gas must travel within the housing before exiting via the nozzles. Reducing the travel distance obviously decreases the time required for aspiration to begin; it reduces loss of gas and gas pressure as well.

Forming entry apertures in the metallic side wall of the Existing Air Cruisers Aspirator does not materially compromise the strength or integrity of the wall. Doing so in non-metallic devices may be problematic, however. Nevertheless, need for principally non-metallic aspirators is increasing as airframe manufacturers, in particular, seek to design aircraft of decreased weight. Hence valuable to these manufacturers are efficient, reliable aspirators of reduced weight.

SUMMARY OF THE INVENTION

The present invention provides such valuable aspirators. Presently-preferred versions of the aspirators incorporate housings primarily of wound filaments of composite materials. Utilizing such materials may reduce overall weight of the devices by approximately one-half to two-thirds.

Filaments of aramids (e.g. Kevlar), fiberglass, or any other suitable material may be employed. Carbon fibers present an especially preferred material for the composite portions of the housings. Such material is, however, susceptible to degradation if subjected to high point loading. Consequently, drilling gas-entry apertures through the walls of the housings is, potentially, disadvantageous.

Accordingly, the present invention contemplates, among other things, positioning gas-entry apertures in a (preferably, although not necessarily) metallic component, such as a cap, at the top of the housing. Unlike the design of the Heimovics patent, however, that of the present invention includes an entry plenum incorporating multiple such apertures communicating with a fluid distribution system preferably (although not necessarily) comprising multiple rings of jet nozzles. Moreover, whereas the jets of the aspirator of the Heimovics patent are located a substantial distance from its flapper valve plates, those of the current invention are not. Instead, by reconfiguring the nozzles as applicants have done, the flapper valve plates may be made to nest within at least one nozzle ring when the plates are open. In essence, then, distance between the plates and at least some nozzles may be reduced to less than the width of the plates.

Although sometimes referred to as "rings," sets of these nozzles need not necessarily form structures having circular cross-section. Indeed, presently-preferred rings are shaped as ovals. Reshaping the rings as ovals improves performance of the aspirators, allowing more rapid inflation of evacuation products.

Housings of the present aspirators may include an integral, outwardly extending flange intended to engage a complementary portion of the to-be-inflated object. This flange allows for robust connection between the aspirator and the inflatable, reducing the possibility of their separating prematurely in use. Preferably the flange has circular cross-section, although those skilled in the art will recognize that other shapes may be used to mate with corresponding portions of the inflatable.

Present housings of the invention additionally may change diameter along their lengths. Whereas the aspirator of the Heimovics patent, for example, appears simply to converge from a larger inlet to a smaller outlet, aspirators of the present invention may size inlets and outlets such that the minimum diameter of the housing is between them. Stated differently, preferred housings of the invention initially converge from the inlets to a central region and then diverge from that central region to the outlets.

Top cap assemblies of the housing include the gas-entry apertures. These caps may be bonded to bodies of the housings, and effecting the bonding at elevated temperature (e.g. 160° F.) may help ensure subsequent thermal expansion of the device does not compromise the bond. The top cap assemblies further may include internal o-rings to block adhesive from interfering with operation of the flapper valve plates. The o-rings, together with the adhesive, also may function to inhibit galvanic corrosion in use. Of course, those skilled in the relevant field will recognize that other connecting, attaching, or bonding methods may be used instead, even if not preferred. Positioning the entry plenums of the top cap assemblies above the flapper valve plates spaces the plates from any surrounding structure (e.g. the aircraft fuselage), helping ensure airflow into the inlet may always occur.

It thus is an optional, non-exclusive object of the present invention to provide reduced-weight aspirators without sacrificing performance or reliability.

It is another optional, non-exclusive object of the present invention to provide aspirators having housings made primarily of wound filaments of composite materials.

It is also an optional, non-exclusive object of the present invention to provide aspirators whose gas-entry apertures do not extend through walls of the housings.

It is, moreover, an optional, non-exclusive object of the present invention to provide aspirators having entry-aperture plenums communicating with a fluid distribution system preferably comprising multiple rings of jet nozzles.

It is a further optional, non-exclusive object of the present invention to provide aspirators with reduced distance between flapper valve plates and the jet nozzles.

It is yet another optional, non-exclusive object of the present invention to provide aspirators including oval- or other-shaped "rings" of nozzles.

It is additionally an optional, non-exclusive object of the present invention to provide aspirators including an outwardly extending (annular) flange facilitating connection with an inflatable object.

It is, furthermore, an optional, non-exclusive object of the present invention to provide aspirators whose housings have minimum diameter at locations intermediate the inlets and the outlets.

It is an additional optional, non-exclusive object of the present invention to provide aspirators having top caps bonded to housing bodies at elevated temperatures to pre-accommodate thermal expansion, with the caps also designed to inhibit galvanic corrosion of components while the aspirators are deployed.

Other objects, features, and advantages of the present invention will be apparent to those skilled in the appropriate art with reference to the remaining text and the drawings of this application.

DETAILED DESCRIPTION

Figure 1:
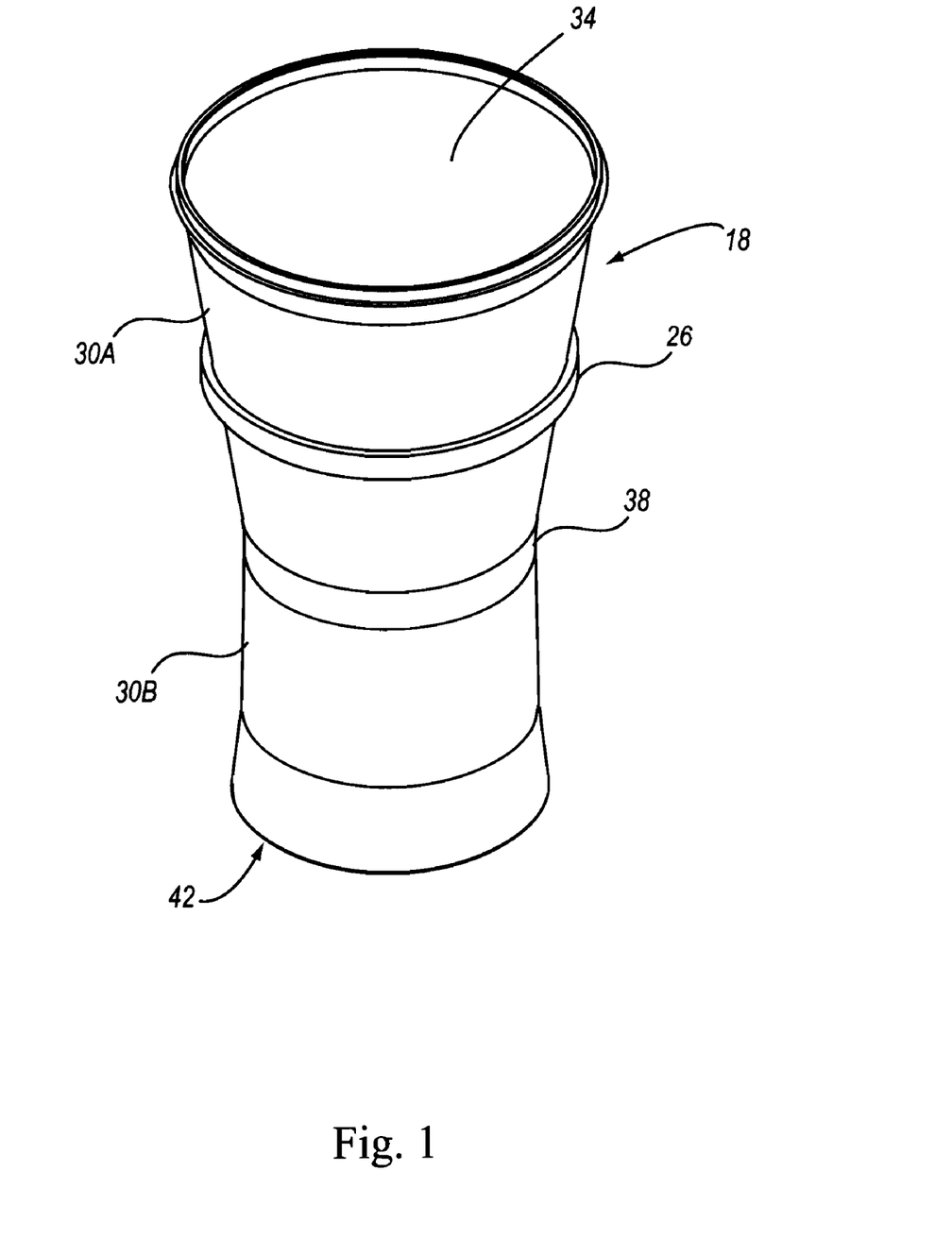
FIG. 1 is an isometric view of a housing body of an exemplary aspirator of the present invention.
Figure 9:
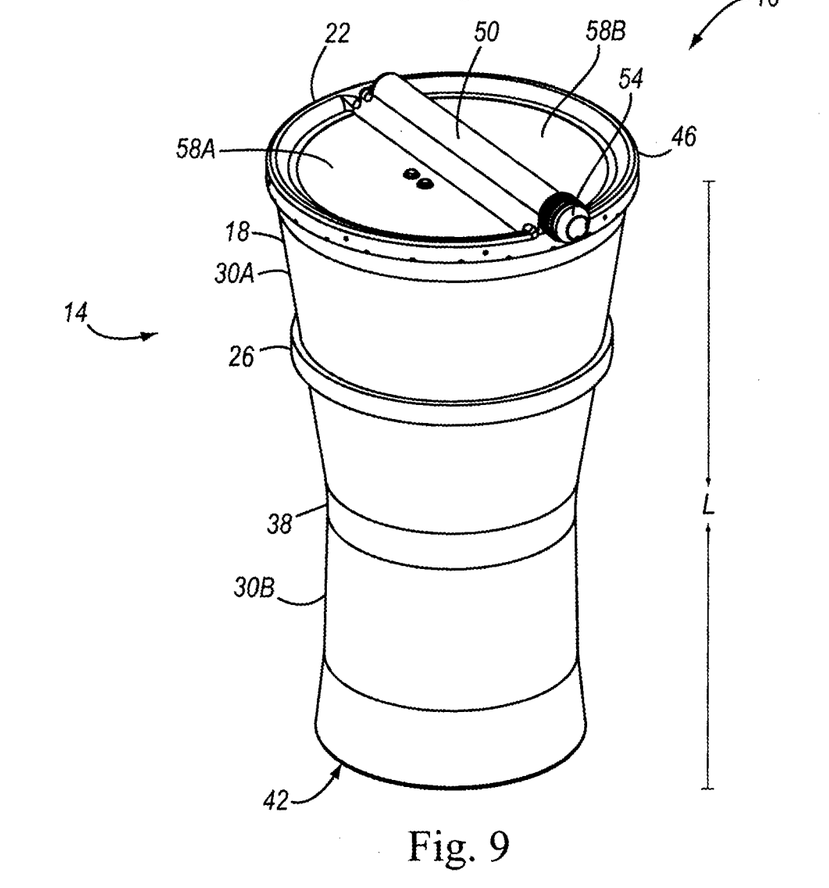
FIG. 9 is an isometric view of an exemplary aspirator of the present invention incorporating the body of FIG. 1, the top cap assembly of FIGS. 2-4, and the jet nozzle assembly of FIGS. 5-8.

Illustrated in FIG. 9 is exemplary aspirator 10 consistent with the present invention. Aspirator 10 may be formed of housing 14 comprising body 18 and top cap assembly 22. Body 18 preferably has circular cross-section, albeit with diameter varying along its length L. Body 18 may, however, be shaped other than as depicted in FIGS. 1 and 9.

Contrasted with conventional aspirator housing bodies, body 18 beneficially may be formed as a monolithic structure of wound filaments rather than of one or more machined metal components. Filaments of carbon, aramids (including Kevlar), fiberglass, or otherwise may be wound to create body 18, providing the body 18 with satisfactory strength while reducing its weight substantially as compared with conventional metallic bodies.

Protruding externally from body 18 is flange 26. The flange 26 preferably is annular, although it may assume other shapes instead. Regardless of its shape, however, flange 26 is intended to engage a complementary portion of an inflatable object so as to connect the object to aspirator 10. Flange 26 advantageously may be formed integral with the remainder of body 18, although persons appropriately skilled in the art will recognize that it may be formed otherwise if desired. Likewise, body 18 may connect to the inflatable object other than by using flange 26, so in this respect the flange 26 is optional.

Body 18 may comprise at last two generally frustoconical sections 30A-B. Section 30A has maximum diameter at inlet 34, tapering to minimum diameter at region 38. Section 30B likewise has minimum diameter at region 38, expanding to its maximum diameter at outlet 42. The converging/diverging nature of body 18 promotes airflow through aspirator 10 and thus presently is preferred.

Figure 2:
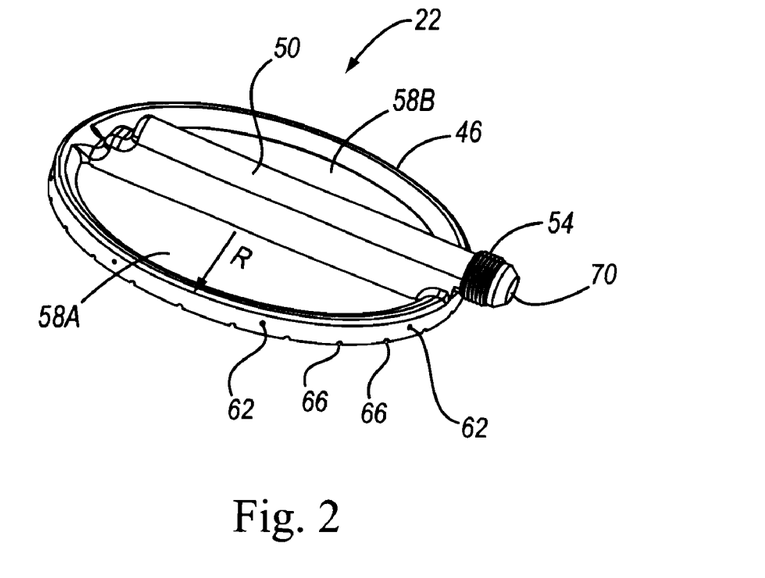
FIG. 2 is an isometric view of, principally, the external side of a top cap assembly of the housing of an aspirator of the present invention.
Figure 3:
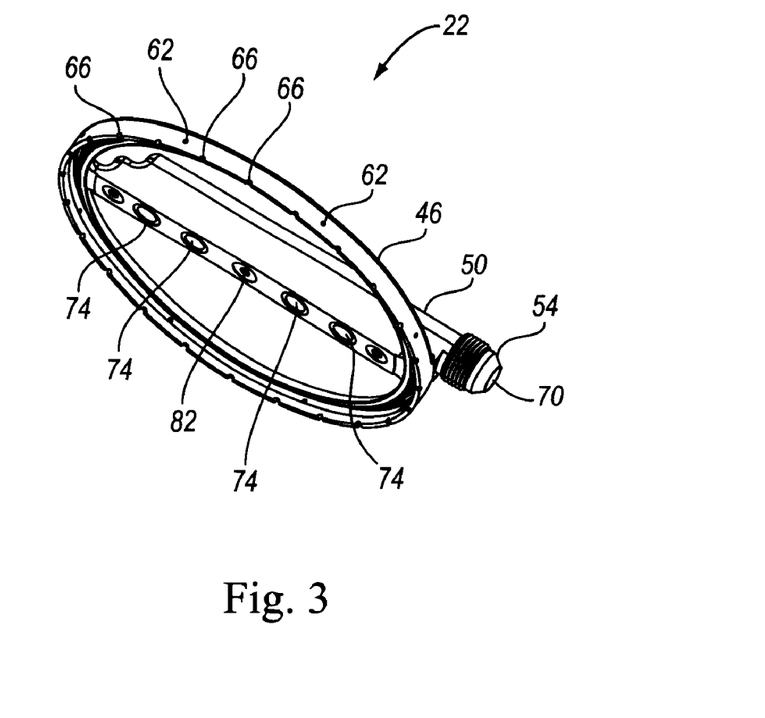
FIG. 3 is an isometric view of, principally, the internal side of the top cap assembly of FIG. 2 (with flapper valve plates removed).
Figure 4:
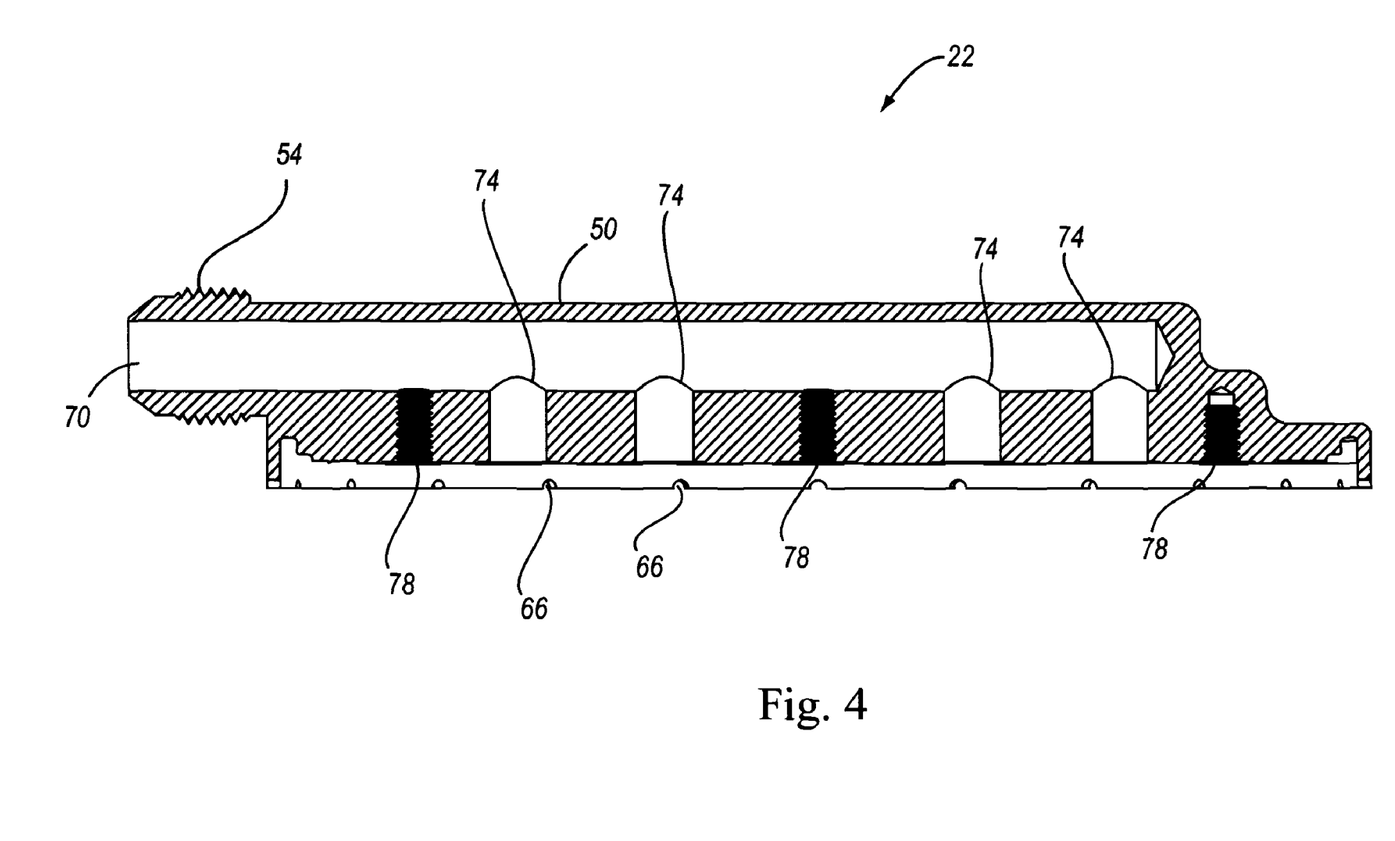
FIG. 4 is an elevational, cross-sectional view of a portion of part of the top cap assembly of FIG. 2.

Detailed in FIGS. 2-4 is top cap assembly 22 of housing 14. Cap assembly 22 may include at least rim 46, plenum 50, fitting 54, and flapper valve plates 58A-B. As illustrated especially in FIG. 9, plenum 50 beneficially protrudes above rim 46; when aspirator 10 is deployed for use, protruding plenum 50 inhibits the aspirator 10 from being installed with rim 46 flush against a surface, thereby helping ensure airflow paths always exist in areas adjacent valve plates 58A-B.

Rim 46 may be bonded to body 18 at inlet 34. In some embodiments of the invention, rim 46 is mounted onto body 18, with adhesive then injected into the rim 46 via injection holes 62. Appearance of adhesive in weep holes 66 provides visual evidence of relatively uniform dispersion of the adhesive.

Fitting 54 includes inlet port 70 and is designed for direct or indirect connection to a source of pressurized fluid. Such fluid enters plenum 50 through port 70, hence avoiding any need to drill entry apertures through body 18. The fluid thereafter exits plenum 50 via one or more outlet ports 74, of which four (as shown in FIG. 3) preferably exist. When more than one outlet port 74 is present, the ports 74 preferably are spaced radially across rim 46. Any appropriate structure may connect plenum 50 and flapper valve plates 58A-B to rim 46; in some versions of aspirator 10, such structure may include fasteners 78 placed in holes 82 of plenum 50 and in corresponding holes of a base 79 (FIG. 11) to which valve plates 58A-B attach using hinges 80.

Figure 5:
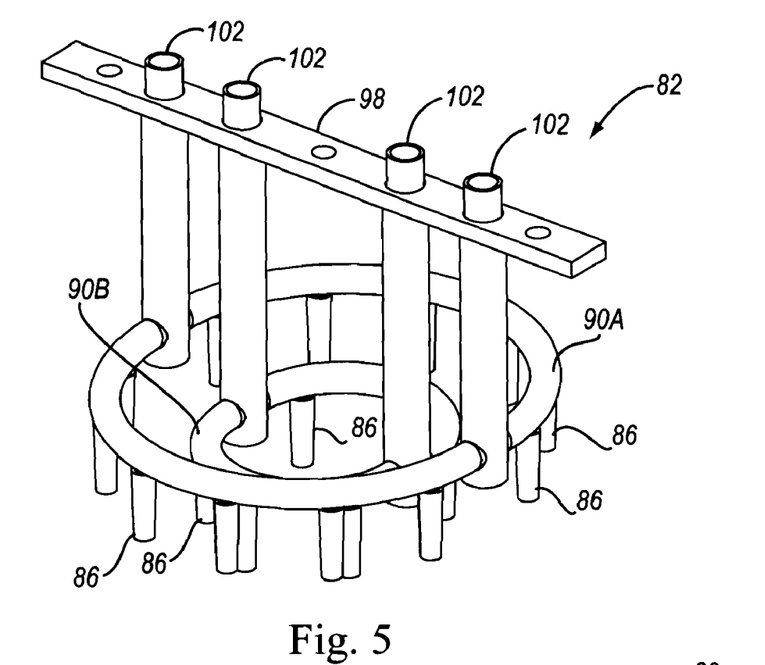
FIG. 5 is an isometric view of a jet nozzle assembly of the aspirator of the present invention.
Figure 6:
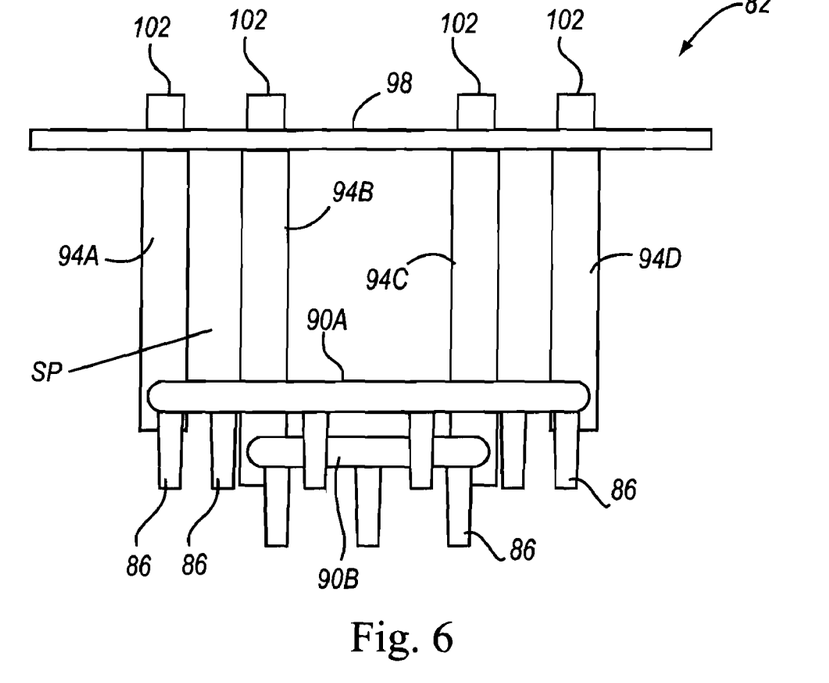
FIG. 6 is an elevational view of the jet nozzle assembly of FIG. 5.

Communicating with outlet ports 74 is nozzle assembly 82 (see FIGS. 5-8). Included as part of assembly 82 are multiple jet nozzles 86 from which pressurized fluid is exhausted. Also part of assembly 82 is distribution system 90A-B (preferably, although not necessarily, in the form of "rings") as well as fluid conduits 94A-D. Although FIGS. 5-6 depict two distribution rings and four conduits, more or fewer of these components may be utilized instead.

Figure 10:
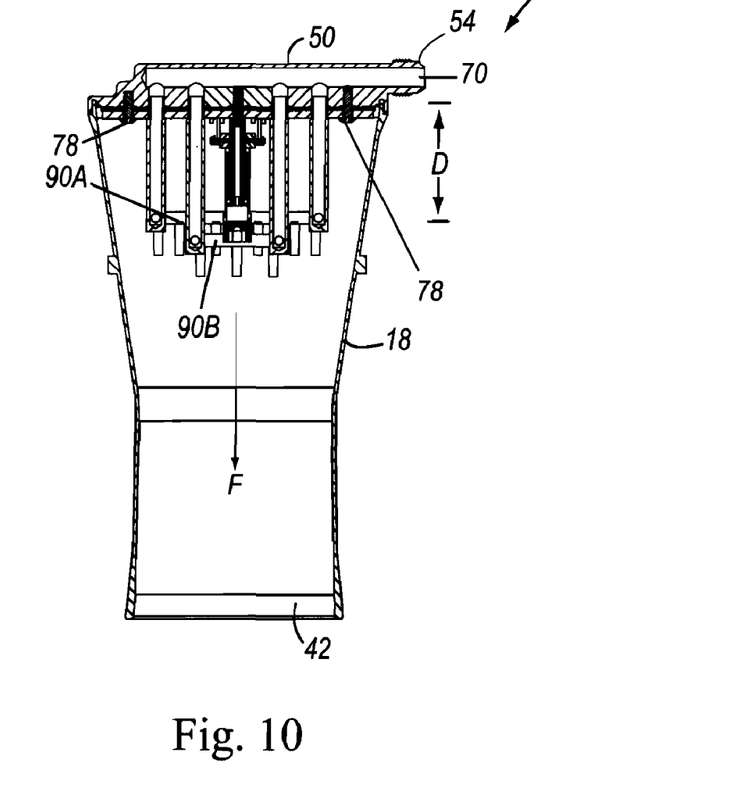
FIG. 10 is an elevational, cross-sectional view of the aspirator of FIG. 9.
Figure 11:
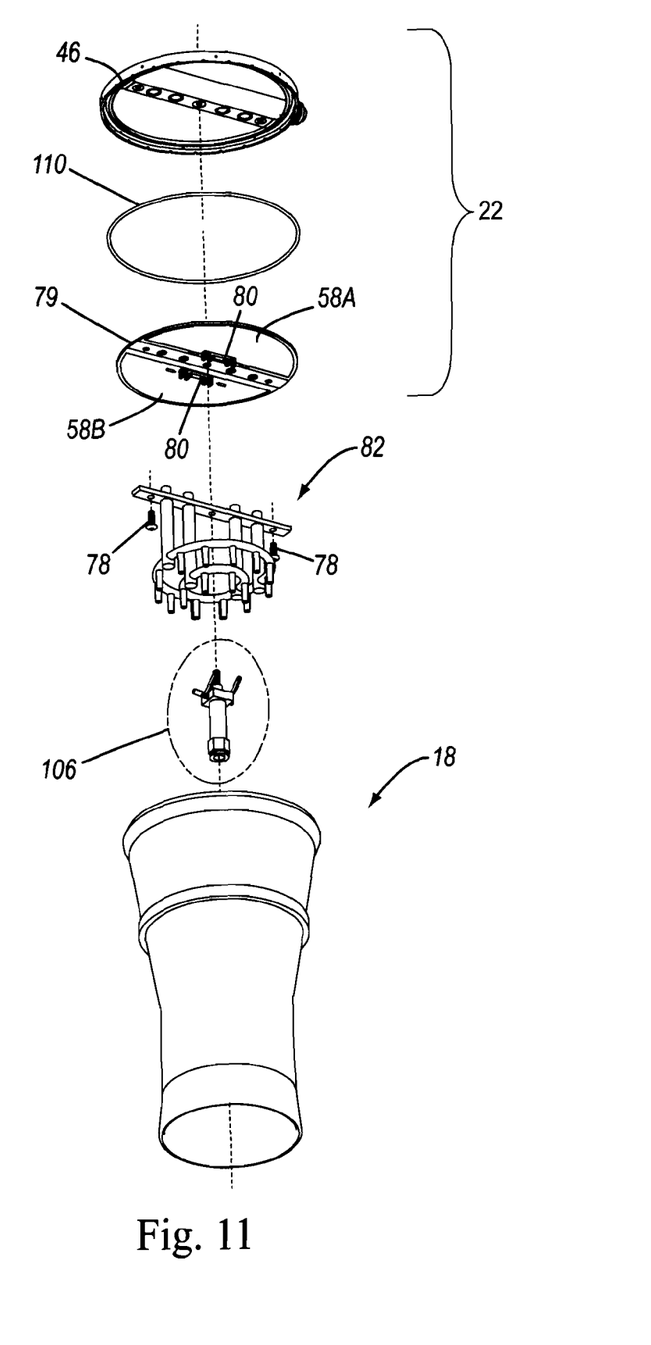
FIG. 11 is an exploded view of the aspirator of FIG. 9.

Assembly 82 also incorporates mounting plate 98, whose holes 102 align for fastening (using fasteners 78; FIGS. 10-11) directly or indirectly to plenum 50. When mounting plate 98 is so fastened, each of conduits 94A-D communicates with a corresponding outlet port 74 so as to convey pressurized fluid to distribution system 90A-B. Outer conduits 94A and 94D communicate with outer distribution system 90A, while inner conduits 94B-C communicate with inner distribution system 90B. Assembly 82 may be designed so that no substantial closed paths exist that might otherwise allow unwanted debris (e.g. salt) to accumulate.

Figure 7:
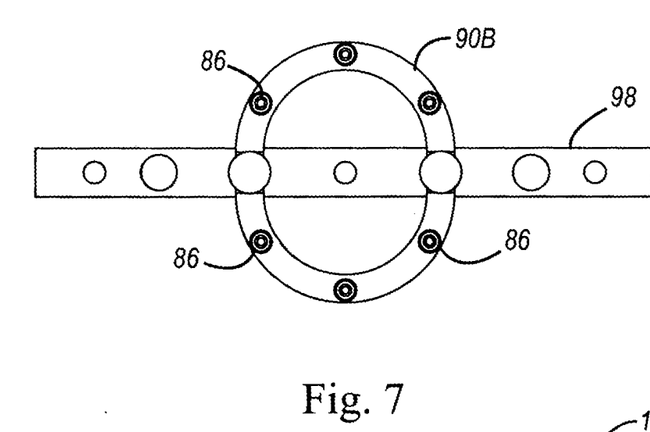
FIG. 7 is a bottom plan view of the inner ring of the jet nozzle assembly of FIG. 5.
Figure 8:
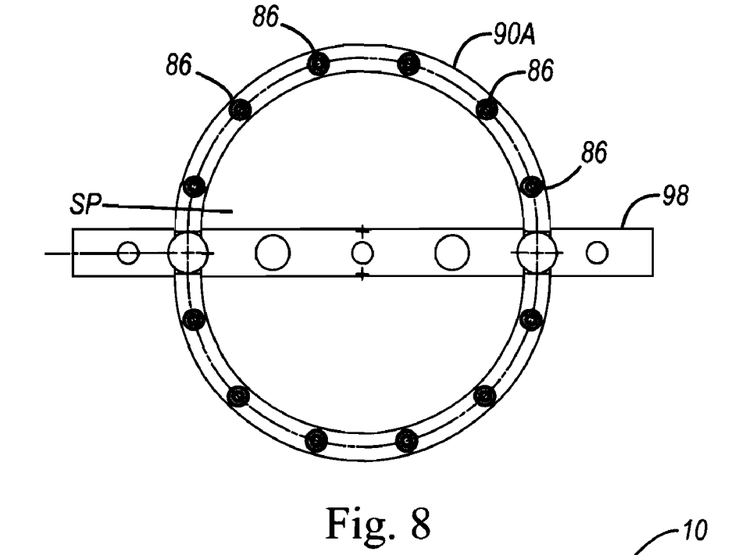
FIG. 8 is a bottom plan view of the outer ring of the jet nozzle assembly of FIG. 5.

Either or both of the "rings" of distribution system 90A-B may assume any desired shape. Presently preferred, however, is an oval shape for both ring 90B and ring 90A as shown in FIGS. 7-8, respectively. This oval shape complements the shape of body 18 in a manner facilitating aspiration.

The oval shape of, especially, ring 90A, together with the positioning of ring 90A above ring 90B, also permits the rings 90A-B to be placed closer to flapper valve plates 58A-B and inlet 34 than are analogous distribution rings in use today. Indeed, ring 90A is sized, shaped, and positioned so that valve plates 58A-B, when fully open, may nest within space SP bounded by ring 90A. Consequently, distance D (FIG. 10) between inlet 34 and ring 90A may be less than the radius R (or width) of a valve plate 58A (or 58B), as the valve plate 58A (or 58B) will not contact assembly 82 even when fully open. This closer placement of rings 90A-B to inlet 34 enhances efficient intake of gas through inlet 34 when nozzles 86 are operating.

Illustrated in FIG. 11 are other features of aspirator 10, including spring assembly 106 as well as o-ring 110 and base 79 defining portions of cap assembly 22. As noted earlier, fasteners 78 may function to connect nozzle assembly 82 and cap assembly 22 (including base 79) so that fluid communication between plenum 50 and nozzle assembly 82 may occur.

Figure 12:
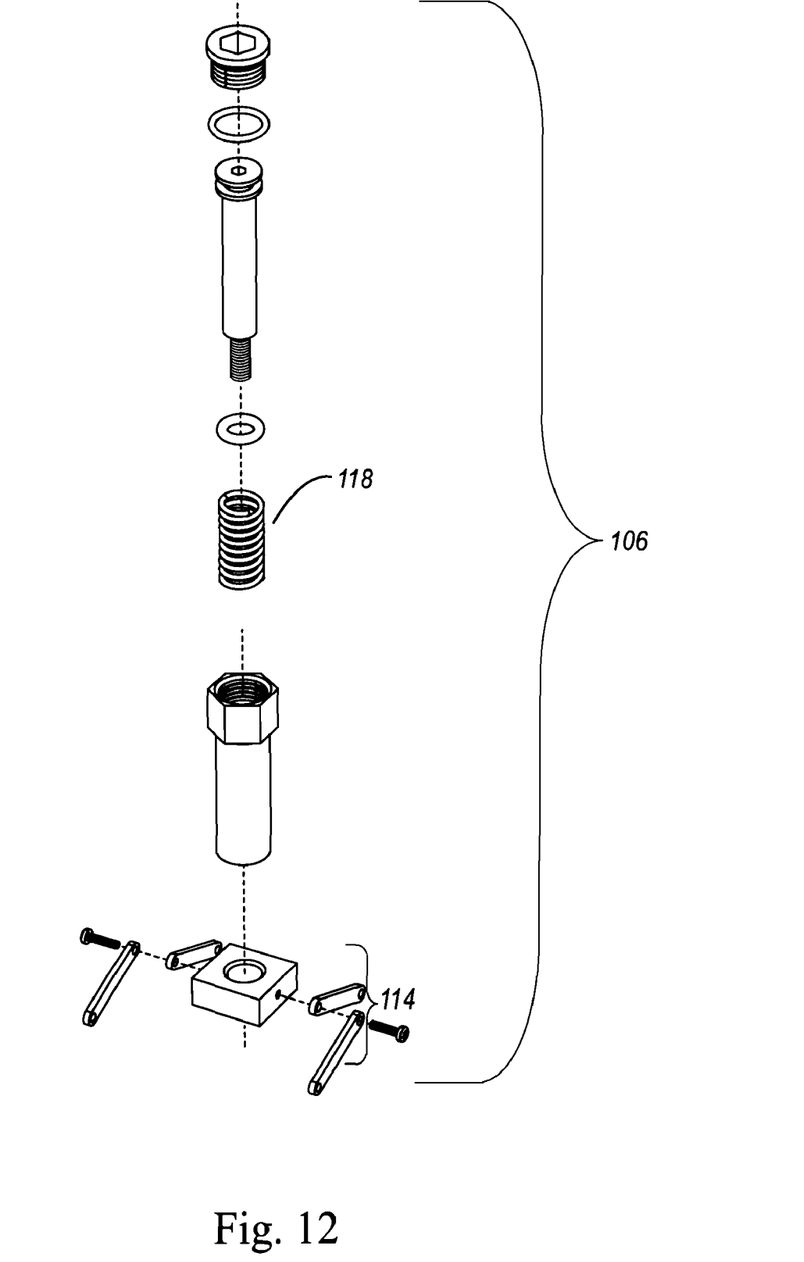
FIG. 12 is an exploded view of a spring assembly of the aspirator of FIG. 9.

Spring assembly 106, finally, biases valve plates 58A-B to the position shown in FIGS. 9-10 in which plates 58A-B close inlet 34. In particular, arms 114 of assembly 106 connect spring 118 to hinges 80. When operational, nozzles 86 create sufficient force in the direction F of FIG. 10 so as to overcome the biasing force of spring 118, causing valve plates 58A-B to open. In certain versions of aspirator 10, valve plates 58A-B are non-metallic, preferably being made of stronger, more rigid carbon or other fiber-reinforced material.

The foregoing is provided for purposes of illustrating, explaining, and describing embodiments of the present invention. Modifications and adaptations to these embodiments will be apparent to those skilled in the art and may be made without departing from the scope or spirit of the invention. In particular, words of position (such as, but not limited to "top," "bottom," etc.) used herein relate to a nominal orientation of aspirator 10. The aspirator 10 need not be deployed in such nominal orientation, however, so none of the positional words of this application should necessarily be interpreted as being absolute in its meaning.

What is claimed is:

1. An aspirator comprising:
   a. a body comprising wound filaments and defining a monolithic wall of circular cross-section lacking any aperture through the wall; and
   b. a cap assembly (i) connected to the body and (ii) defining an inlet port for receiving pressurized fluid.

2. An aspirator according to claim 1 in which the body has opposed open ends, one end defining a gas inlet and the other end defining a gas outlet.

3. An aspirator according to claim 2 in which the cap assembly comprises a plenum communicating with the inlet port.

4. An aspirator according to claim 3 in which the body has a length, further comprising a nozzle assembly communicating with the plenum, the nozzle assembly comprising:
   a. an inner distribution system from which at least one nozzle depends; and
   b. an outer distribution system (i) from which at least one nozzle depends and (ii) spaced from the inner distribution system along the length of the body.

5. An aspirator according to claim 4 in which (a) the outer distribution system comprises an outer distribution ring, (b) the inner distribution system comprises an inner distribution ring, and (c) the outer distribution ring is closer to the gas inlet than is the inner distribution ring.

6. An aspirator comprising:
   a. a body (i) comprising wound filaments, (ii) lacking any fluid entry aperture through the wound filaments, (iii) having opposed open ends, one end defining a gas inlet and the other end defining a gas outlet, and (iv) having a length;
   b. a cap assembly (i) connected to the body, (ii) defining an inlet port for receiving pressurized fluid, and (iii) comprising a plenum communicating with the inlet port; and
   c. a nozzle assembly communicating with the plenum and comprising:
      i. an inner distribution system (A) from which at least one nozzle depends and (B) comprising an inner distribution ring; and
      ii. an outer distribution system (A) from which at least one nozzle depends, (B) spaced from the inner distribution system along the length of the body, and (C) comprising an outer distribution ring closer to the gas inlet than is the inner distribution ring; and
   in which each of the inner and outer distribution rings has an oval shape.

7. An aspirator according to claim 6 in which the cap assembly further comprises flapper valve plates moveable between a first position closing the gas inlet and a second position in which at least portions of the flapper valve plates nest within space bounded by the outer distribution ring.

8. An aspirator according to claim 7 in which the flapper valve plates comprise non-metallic material.

9. An aspirator according to claim 8 in which the body defines an annular external flange facilitating engagement of the aspirator with an object to be inflated thereby.

10. An aspirator according to claim 9 in which the body defines at least two frustoconical sections.

11. An aspirator according to claim 10 in which the cap assembly is bonded to the body.

12. An aspirator according to claim 11 in which the cap assembly is bonded to the body in a manner pre-accommodating thermal expansion.

13. An aspirator according to claim 12 further comprising a spring assembly biasing the flapper valve plates toward the first position.

14. An aspirator according to claim 3 in which the body has a length, further comprising a nozzle assembly communicating with the plenum, the nozzle assembly comprising:
   a. an inner distribution ring from which at least one nozzle depends; and
   b. an outer distribution ring from which at least one nozzle depends.

15. An aspirator comprising:
   a. a body;
   b. a cap assembly (i) connected to the body, (ii) defining an inlet port for receiving pressurized fluid, and (iii) comprising a plenum communicating with the inlet port; and
   c. a nozzle assembly communicating with the plenum and comprising:
      i. an inner distribution system (A) from which at least one nozzle depends and (B) comprising an inner distribution ring; and ii. an outer distribution system (A) from which at least one nozzle depends and (B) comprising an outer distribution ring, at least one of the inner and outer distribution rings having an oval shape.

16. An aspirator according to claim 15 in which both of the inner and outer distribution rings have an oval shape.

* * * * *